United States Patent [19]
Hipkiss et al.

[11] Patent Number: 5,629,489
[45] Date of Patent: May 13, 1997

[54] LOAD CELL ASSEMBLY WITH LINEARIZATION AND COMMON MODE DISCRIMINATION OF COMPLEMENTARY FORCE-RESPONSIVE SIGNALS

[75] Inventors: Victor E. Hipkiss, Sonoma; Miles O. Strom, Windsor, both of Calif.

[73] Assignee: Weigh-Tronix, Inc., Fairmont, Minn.

[21] Appl. No.: 383,967

[22] Filed: Feb. 6, 1995

[51] Int. Cl.$^6$ .................................................. G01L 1/00
[52] U.S. Cl. .................. 73/862.622; 73/862.59; 364/571.03; 364/571.01
[58] Field of Search .................... 73/766, 862.59, 73/DIG. 1, 862.622, 765; 364/571.01, 571.03, 573, 508

[56] References Cited

U.S. PATENT DOCUMENTS

| | | |
|---|---|---|
| 3,140,450 | 7/1964 | Tavis . |
| 3,332,506 | 7/1967 | Bradfield . |
| 3,479,536 | 11/1969 | Norris . |
| 3,541,849 | 11/1970 | Corbett . |
| 3,712,395 | 1/1973 | Streater et al. . |
| 3,869,004 | 3/1975 | Gallo . |
| 3,951,221 | 4/1976 | Rock . |
| 3,991,840 | 11/1976 | Rawcliffe . |
| 4,020,448 | 4/1977 | Corbett . |
| 4,041,289 | 8/1977 | Brosh et al. . |
| 4,080,657 | 3/1978 | Caldicott et al. ............... 364/571.03 |
| 4,089,058 | 5/1978 | Murdock . |
| 4,139,070 | 2/1979 | Hanson et al. . |
| 4,175,243 | 11/1979 | Corbett . |
| 4,219,089 | 8/1980 | Gard et al. . |
| 4,239,088 | 12/1980 | Check et al. . |
| 4,485,323 | 11/1984 | Corbett . |
| 4,503,922 | 3/1985 | Brosh et al. . |
| 4,535,638 | 8/1985 | EerNisse et al. . |
| 4,545,445 | 10/1985 | Naito ........................... 364/571.03 |
| 4,598,381 | 7/1986 | Cucci ............................... 73/766 |
| 4,691,290 | 9/1987 | Griffen . |
| 4,751,849 | 6/1988 | Paros et al. ...................... 73/862.59 |
| 4,804,875 | 2/1989 | Albert . |
| 4,838,369 | 6/1989 | Albert . |
| 4,858,145 | 8/1989 | Inoue et al. ..................... 364/571.03 |
| 5,197,334 | 3/1993 | Guziak .......................... 364/571.03 |
| 5,243,545 | 9/1993 | Ormond ............................ 364/573 |
| 5,313,023 | 5/1994 | Johnson . |
| 5,336,854 | 8/1994 | Johnson . |
| 5,391,844 | 2/1995 | Johnson et al. . |
| 5,442,146 | 8/1995 | Bell et al. ........................ 73/862.59 |

*Primary Examiner*—Elizabeth L. Dougherty
*Assistant Examiner*—Ronald Biegel
*Attorney, Agent, or Firm*—Gray Cary Ware & Freidenrich

[57] ABSTRACT

A load cell assembly includes a load cell body having a pair of sensors mounted therein which provide complementary output signals in response to a force applied to the load cell body. A linearization and common mode discrimination routine analyzes changes in the sensor outputs and characterizes the changes as being either primarily due to applied force or primarily due to common mode effects. A force value, indicative of the applied force on the load cell body, is updated only for changes in the sensor outputs which are primarily due to applied force. However, changes which are primarily due to common mode effects are not incorporated into force value calculations, whereby common mode effects are rejected.

33 Claims, 6 Drawing Sheets

LOAD CELL ASSEMBLY WITH LINEARIZATION AND COMMON MODE DISCRIMINATION OF COMPLEMENTARY FORCE-RESPONSIVE SIGNALS

FIELD OF THE INVENTION

The invention is directed to a load cell assembly and controller therefor for processing complementary force-responsive signals to obtain a force value responsive to the applied force on the assembly. More particularly, the invention is directed to a load cell assembly and controller therefor for linearizing and rejecting common mode effects, such as due to temperature, humidity, barometric pressure and long term drift, from the complementary force-responsive signals to obtain a force value substantially free of many of the effects.

BACKGROUND OF THE INVENTION

Environmental effects, such as those due to temperature, humidity, barometric pressure, etc. may have a significant effect on the performance of force sensors such as load cell assembly. By a "load cell assembly" what is meant is a load cell body which receives an applied force, and which includes associated force sensors and driving electronics therefor for sensing, calculating, and outputting a force value representative of the applied force on the load cell body.

Many attempts have been made to reduce or eliminate the effects of environmental conditions on the output of a load cell assembly. For example, a load cell assembly may be isolated or sealed against particular effects such that the assembly is used in more carefully controlled environmental conditions. However, it has been found that completely sealing a load assembly from environmental effects is difficult, if not impossible, particularly when an assembly is used in more rigorous environments (e.g., environments with wide temperature variances).

Another manner of accommodating for environmental conditions is to eliminate or reduce the effects thereof electronically through signal processing. For example, one manner in which environmental effects may be reduced is through differential sensing, whereby a pair of force sensors are mounted in a load cell body in such a manner that they react oppositely, or complementary, to an applied force. Typically, the applied force may be due to weight, acceleration, impact, pressure, etc.

Different force sensors may be included on a load cell assembly to react complimentary to one another. For example, the force sensors may be placed in tension and compression modes, whereby an applied force will place one sensor in tension, and the other in compression. With strain gauges or other analog force sensors, the resistances of the complementary sensors will respectively increase and decrease due to applied force. Similarly, with resonator sensors such as vibrating strings and tuning forks, the resonant frequencies of the sensors will respectively increase and decrease due to applied force.

In theory, by subtracting the output of one force sensor from the output of the other force sensor (i.e., processing the differential effects), a generally reliable output signal indicative of the applied force may be obtained. Errors due to environmental effects in theory are rejected from the output signal because they tend to affect each sensor similarly (i.e., they are common mode effects), and are thus cancelled out in the subtraction operation. However, it has been found that it is difficult to manufacture complimentary sensors which have precisely matched sensitivities to common mode effects. Therefore, subtracting their output signals will not entirely cancel out the common mode effects.

U.S. Pat. No. 4,815,547 to Dillon et al. represents one attempt to improve the correction of common mode effects from a differential output of complimentary sensor signals. In the Dillon et al. assembly, a pair of strain gauges are placed in tension, and another pair are placed in compression. The four strain gauges are coupled in a bridge circuit which produces an analog differential signal that represents a percentage of a reference signal. The analog differential signal is then converted to digital form and linearized and corrected for common mode effects by applying a quadratic equation with first and second order coefficients to the signal. Temperature correction is performed using a separate temperature sensor located on the assembly.

One advantage of Dillon et al. is that the coefficients of the quadratic equation may be determined from environmental testing, then stored in a memory on the assembly to characterize the assembly without the need for any hardware modifications. However, Dillon et al. suffers from a drawback in that the system is primarily analog, which limits the possible resolution of the system irrespective of any digital signal processing that is later performed. Dillon et al. utilizes analog strain gauges, an analog bridge circuit, and an A/D convertor, all of which have limited resolution. Consequently, assemblies of this type are typically unable to exceed resolutions of 6,000 divisions over a reasonable temperature range.

On the other hand, U.S. patent application Ser. No. 08/064,551, filed on May 19, 1993 by Bell et al., now U.S. Pat. No. 5,442,146, issued Aug. 15, 1995, discloses a fully digital load cell assembly which is capable of providing much higher resolution than prior analog-based systems. The Bell et al. load cell assembly utilizes double ended tuning forks placed in tension and compression modes which may be quickly and reliably converted from frequency to digital form. Bell et al. utilizes independent digital signal acquisition and conditioning such that the sensor signals are independently retrieved, amplified and filtered. The signals are then combined in a linearization and common mode rejection routine to digitally adjust the sensitivities of the sensor outputs to remove common mode effects during the differencing operation. The individual sensitivities of the sensor outputs are modeled by a quadratic equation having calibration constants which are determined from applying known forces to an assembly and curve-fitting the data points obtained therefrom.

The Bell et al. load cell assembly uses a separate temperature correction routine that corrects for zero shift and span error due to temperature based upon calibration data determined from environmental testing and programmed into the assembly. This eliminates the need for a separate temperature sensor, as the temperature also may be extracted from the sensor output signals.

As a result, Bell et al. may provide much greater resolution than typical analog-based systems, typically about 10,000 or more divisions. The improved resolution of resonator sensors, coupled with the independent signal processing and reliable digital linearization, common mode rejection and temperature compensation, are significantly improved over prior analog-based systems.

Each of the above systems, however, requires separate corrections to be performed for various common mode effects such as temperature, humidity, barometric pressure, long term drift, etc. For example, to correct the Bell et al.

load cell assembly for the effects of humidity, a separate humidity correction routine, similar to that performed for temperature correction, would be required. However, requiring separate corrections for different common mode effects would require separate signal processing for each effect, which would significantly add to the number of calculations needed for each force value update.

Furthermore, correcting for separate effects would require separate calibration procedures to determine the particular coefficients for the correction routines. For example, it is known that temperature is typically the most prevalent common mode effect. Moreover, zero shift due to temperature constitutes the most prevalent part of this effect. Calibration for temperature typically requires sample data to be taken at at least three (and preferably more) temperatures. To obtain data readings at various temperatures, each load cell assembly must be allowed to obtain a uniform temperature in a controlled environment, which may take over an hour or more. Consequently, performing calibration over several temperatures often takes at least a day for some assemblies, which typically adds to the manufacturing time and costs of the assemblies. To calibrate for other effects, such as humidity, barometric pressure, etc., similar calibration routines to that for temperature would be required, further adding to the manufacturing cost and time for the assemblies.

Therefore, a need exists in the art for a load cell assembly and routine therefor for reducing or eliminating many common mode effects in a fast and efficient manner to obtain higher resolutions. In addition, a need exists for a load cell assembly and routine therefore which may reduce or eliminate the amount of costly and time-consuming calibration procedures which are currently required.

SUMMARY OF THE INVENTION

The invention addresses these and other problems associated with the prior art in providing a load cell assembly incorporating a linearization and common mode discrimination routine which performs exclusive filtering on complementary force sensor outputs to reject common mode effects therefrom.

Routines consistent with the invention focus on changes sensed by the complementary outputs of a load cell assembly, in contrast to prior art designs which focus on the steady state absolute outputs of the force sensors. By sensing changes in the sensor outputs, changes sensed over discrete periods may be discriminated or characterized as being either force changes which are primarily due to applied force, or non-force changes which are primarily due to common mode effects. Then, only force changes may be incorporated into the force value calculation, with non-force changes representing common mode effects being effectively blocked from the calculation. This is different from prior art designs where common mode effects are routinely carried through the initial force value calculations and are later compensated for by various correction routines.

Therefore, according to one aspect of the invention, a load cell assembly is provided for generating a force value indicative of an applied force. The load cell assembly includes a load cell body adapted to receive the applied force; first and second sensing means, coupled to the load cell body, for respectively providing first and second sensed signals which react in a complementary manner in response to the applied force on the load cell body; discriminating means, coupled to receive the first and second sensed signals, for discriminating between (1) applied force changes in the first and second sensed signals, and (2) common mode effect changes in the first and second sensed signals; and force calculating means, coupled to the discriminating means, for updating the force value in response to the applied force changes in the first and second sensed signals.

In accordance with a further aspect of the invention, a driver is provided for generating a force value indicative of a force that is applied to a load cell assembly of the type including first and second force sensors which have complementary sensitivity to the applied force. The driver includes first and second sampling means, coupled to the first and second force sensors, for periodically providing first and second sensed values, respectively; characterizing means, coupled to the first and second sampling means, for characterizing changes in the first and second sensed values between a pair of samples as representing a force change or a non-force change, wherein a force change represents changes in the first and second sensed values which are primarily due to applied force, and a non-force change represents changes in the first and second sensed values which are primarily due to common mode effects; and force accumulating means, coupled to the characterizing means, for updating the force value, by summing the force value with a force change value, responsive to a force change.

In accordance with an additional aspect of the invention, a method is provided for generating a force value indicative of an applied force in a load cell assembly of the type including first and second force sensors mounted in a load cell body to exhibit complementary sensitivity to the applied force. The method includes the steps of driving the first and second force sensors to generate first and second sensed signals, respectively; calculating first and second change values representative of respective changes in the first and second sensed signals over a predetermined time period; determining whether the first and second change values are primarily representative of force or non-force changes, a force change being indicative of changes in the first and second sensed signals which are primarily due to applied force, and a non-force change being indicative of changes in the first and second sensed signals which are primarily due to common mode effects; and updating the force value by summing the force value with a force change value when the first and second change values are representative of force changes, wherein the force change value is representative of the change in applied force over the predetermined time period.

These and other advantages and features, which characterize the invention, are set forth in the claims annexed hereto and forming a further part hereof. However, for a better understanding of the invention, and the objectives and advantages obtained by its use, reference is made to the Drawing, and to the accompanying descriptive matter, in which there is described a preferred embodiment of the invention.

BRIEF DESCRIPTION OF THE DRAWING

FIG. 5 shows a main routine with the load cell bus information exchange interrupts therefor, and FIG. 6 shows an input capture interrupt for acquiring and conditioning the outputs of the transducers in the assembly of FIG. 1.

DETAILED DESCRIPTION OF THE PREFERRED EMBODIMENTS

Figure 1:
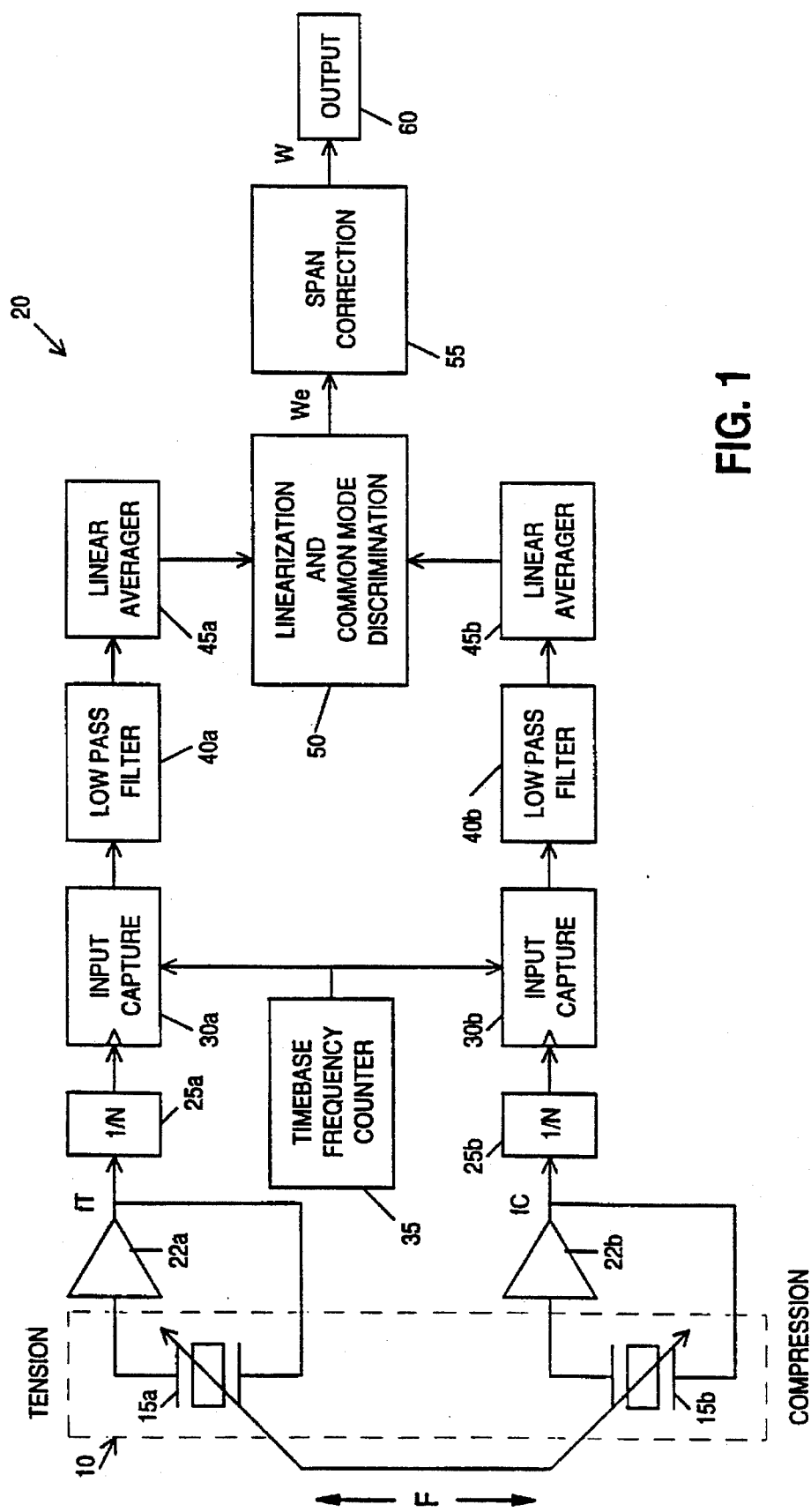
FIG. 1 is a functional block diagram of a preferred load cell assembly consistent with the principles of the invention.

Turning to the Drawing, wherein like numbers denote like parts throughout the several views, FIG. 1 shows a functional block diagram of a preferred load cell data controller 20 consistent with the principles of the invention. The invention includes improved or alternate methods of linearization and common mode rejection to those disclosed in the aforementioned Bell et al. U.S. patent application, which is incorporated by reference herein.

The preferred load cell data controller 20 may include substantially the identical hardware to that disclosed in Bell et al., and therefore, many hardware components and software routines disclosed in this reference will not be disclosed in detail herein. However, several modifications to the preferred Bell et al. controllers will be disclosed herein to the extent that the preferred controller 20 differs from that disclosed in Bell et al.

Program control for the Bell et al. controller may be provided by a microprocessor or microcontroller such as a Motorola MC 68HC11F18-bit microprocessor, and having the necessary program code and configuration data stored on a non-volatile storage device such as an Intel 27C256 32k×8 EPROM. Moreover, signal input and basic frequency to digital conversion may be performed on a Field Programmable Gate Array (FPGA) such as a Xilinx x13030 which is configured by the microprocessor with data stored in the EPROM. The microprocessor in controller 20 may also be provided with serial data handlers to transmit and receive information to and from a weighing or other force sensing device across a load cell bus.

It will be appreciated, however, that many different hardware and/or software configurations may be utilized to perform the preferred routines consistent with the invention. Therefore, the disclosure of the routines of the invention running on the Bell et al. hardware is provided merely for illustration.

Load Cell and Sensors Therefor

As shown in FIG. 1, load cell data controller 20 preferably drives a pair of load sensing elements 15a and 15b located on a load cell 10 and generates a force value representative of the applied force exerted on the load cell. Load cell 10 is preferably of the type generally described in U.S. Pat. No. 5,313,023 to Thomas H. Johnson, which is assigned to the Assignee of the present invention, and which is incorporated by reference herein.

The Johnson load cell generally includes a load cell body with an interior aperture having a base located on one wall thereof. A load beam spans across the aperture from the base, and a pair of cantilevered beams extend from the base generally parallel to the load beam. A pair of force sensors are affixed between the ends of the cantilevered beams and the load beam such that, upon the application of force to the load cell, one sensor is placed in tension and the other is placed in compression, whereby the sensors provide complementary outputs responsive to the applied force. It will be appreciated that other load cells or force sensors exist which exhibit complementary outputs may be used consistent with the invention, including different strain gauges, vibrating string sensors, resonating sensors, force motors, etc.

Sensors 15a and 15b are preferably double ended tuning fork resonators which have resonant frequencies that vary with the applied force. Preferred resonators include those available from Microcrystal made by ETA of Grenchen, Switzerland. Other resonators which are also useful are those disclosed in Eer Nisse et al U.S. Pat. No. 4,724,351, Eer Nisse et al U.S. Pat. No. 4,215,570, Norling U.S. Pat. No. 4,912,990, Eer Nisse et al U.S. Pat. No. 4,372,173 all of which are incorporated herein by reference. One skilled in the art will appreciate that other forms of transducers besides resonators may be used in conjunction with the preferred embodiment, so long as they provide complementary signals which vary in a complementary fashion in response to an applied load. These transducers may include strain gauges, vibrating strings, piezoelectrics, quartz crystals, etc. Other optical, electro-mechanical, solid state, etc. sensors are known in the art.

Force sensor 15a is hereinafter designated the tension resonator or transducer as this load sensing element will typically be subjected to tensional forces during normal force sensing operations. Similarly, force sensor 15b will hereinafter be designated a compression resonator or transducer as this element is typically subjected to compressional forces during normal force sensing operations.

Frequency Signal Acquisition and Conditioning

Controller 20 acquires and conditions the output signals of the tension and compression resonators 15a and 15b in a similar manner to that used in the Bell et al. controller. Independent sampling circuits are used to acquire and condition each resonator output to provide periodic sensed value samples representative of the resonant frequencies of each resonator. Moreover, the sampling circuits may include filtering and averaging routines to reduce errors in the samples.

Tension resonator 15a is driven by a driving means or driver or a driving circuit such as oscillator circuit 22a. Further, the frequency at which this circuit will oscillate is the resonant frequency, fT, of tension resonator 15a, which is dependent upon the mechanical characteristics of tension resonator 15a. It is also related to the amount of force that is being applied to the tension resonator 15a, as well as to temperature and other environmental effects.

The output of oscillator circuit 22a, designated the first sensed signal, is applied to a converting circuit to convert the first sensed signal into a first sensed value which is a digital representation of the resonant frequency of resonator 15a. The converting means preferably includes a divide-by-n frequency divider 25a, an input capture latch 30a and a time base frequency counter 35.

Divide-by-n frequency divider 25a generates a pulse signal having a frequency equivalent to fT/n, thereby averaging n oscillations of tension resonator 15a together to reduce the effects of transient errors. In a preferred embodiment, n is 16, such that 16 oscillations of tension resonator 15a are counted for each pulse provided by the divide-by-n frequency divider 25a.

The signal output from divider 25a is applied to a gating input capture latch 30a. Input capture latch 30a also receives an input signal from the output of a time base frequency counter 35. Time base frequency counter 35 is a free running counter which increments at a time base frequency and provides a current count value output. In the preferred embodiment, this time base frequency is 19.6608 Mhz, and the counter is 24 bits in length.

Input capture latch 30a latches the present value output of time base frequency counter 35 whenever a pulse is received from divide-by-n frequency divider 25a. The change in output (e.g. from two successive captures) is a measurement of the scaled period of oscillation of the tension resonator 15a in terms of the time base frequency.

Divide-by-n frequency divider 25a, input capture latch 30a and timebase frequency counter 35 are preferably implemented in an FPGA as described in Bell et al. Other hardware or software implementations of these components may also be used.

One skilled in the art will appreciate that many frequency to digital conversion algorithms may be used in place of the one disclosed herein. For instance, time base frequency counter 35 may be reset at the beginning of each cycle, so that the count which is captured by input capture latch 30a is an absolute reading of the period, without having to take two independent readings. However, it has been found that such a reset function would be more complex in design, requiring separate counters for each of the tension and compression resonators and introducing additional delays into the circuit. In addition, one skilled in the art will appreciate that the actual resonant frequency fT may be measured in lieu of the period which is measured herein. However, it has been found that, by running a time base frequency counter at nearly 20 Mhz, greater precision can be obtained in a more reasonable amount of time than by counting the frequency of the resonator, which is typically around 47 Khz.

The output of input capture latch 30a is optionally fed into a low pass filter 40a, which is preferably a software implemented filter that removes high frequency transient noise from the tension resonator frequency value. Low pass filter 40a is preferably a software implemented infinite impulse recursive (IIR) filter which is generally known in the art. This type of filter is historical in nature in that it utilizes past values in the computation, which is typically less processor intensive and requires less memory. For example, this filter may operate according to the function:

$$fT_i = \frac{(Ft_i - fT_{i-1})}{B} + fT_{i-1} \tag{1}$$

wherein $fT_i$ is the output of the filter at time i, $Ft_i$ is the input to the filter at time i, and B is a constant selected to have a suitable filter frequency response.

Other known low pass filters, implemented in software or hardware, may be used in the alternative. Moreover, depending upon the particular application (e.g., the dead load frequency of the sensors) different pass bands may also be used.

The output of low pass filter 40a is optionally fed into a software implemented linear averager 45a which averages several successive values of the filtered tension frequency signal fT to further remove transient errors from the signal and obtain a first sensed value which is a filtered and averaged digital representation of the tension resonator frequency (designated $fT_{avg}$). For example, one preferred linear averager routine operates according to the equation:

$$fT_{avg} = \frac{\sum_{i=1}^{m} fT_i}{m} \tag{2}$$

This averager is implemented by summing m samples, dividing the sum by m, and resetting the running sum. Consequently, a new average tension frequency $fT_{avg}$ is output every m samples. The value for m will vary depending upon the application, e.g. m=256. Other averaging routines may be used consistent with the invention. For example, a queue operating as a sliding averager, such as described in Bell et al., may be used.

The measurement of the resonant frequency of compression resonator 15b is found in a similar manner to that just described for tension resonator 15a. A second driving circuit 22b, which is similar to oscillator circuit 22a, provides a second sensed signal that oscillates at the resonant frequency fC of compression resonator 15b. This signal is applied to a divide-by-n frequency divider 25b, which provides an output having a frequency of fC/n. While the value n need not be the same as that used in block 25a, for simplicity's sake it has been found that a value of 16 for frequency divider 25b is sufficient for the reasons explained above pertaining to divider 25a.

The output of frequency divider 25b is applied to an input capture latch 30b, which also receives an input of the present output value contained in time base frequency counter 35. Input capture latch 30b therefore provides a capture of the time base frequency counter every n oscillations of compression resonator 15b, in increments of the time base frequency. The output of latch 30b is next passed to low pass filter 40b and linear averager 45b, which operate in a similar manner to filter 40a and averager 45a to provide a second sensed value, which is a filtered and averaged digital representation of the compression resonator frequency (designated $fC_{avg}$).

By using the input capture algorithm described herein to obtain count changes due to the frequencies of tension and compression resonators 15a and 15b, it can be seen that a single time base frequency counter may be implemented to handle both resonators. In addition, it can be seen that, because the absolute value stored in time base frequency counter 35 is essentially irrelevant, the input captures 30a and 30b can operate asynchronously providing captures of the time base frequency counter at different points in time.

As discussed above, it is preferable to apply a low pass filter and linear averager to each frequency signal prior to deriving a force value therefrom. In the alternative, a low pass filter and/or linear averager may be applied to the calculated force value output, e.g., after performing linearization and common mode discrimination in block 50 (discussed below).

Linearization and Common Mode Discrimination

The output of linear averagers 45a and 45b essentially contain values representative of the filtered and averaged uncorrected resonant frequencies of the tension and compression resonators 15a and 15b. These values are processed by a linearization and common mode discrimination routine diagrammatically illustrated by block 50.

Routine 50 focuses on the change in the frequency outputs of the force sensors, as opposed to the absolute outputs thereof, in calculating or updating an estimated force value We. As such, common mode effects may be blocked from inclusion in the value of We.

It will be appreciated that a load cell assembly will typically be in one of two states: changing (e.g., when a force is applied to the load cell body) or not changing (e.g., where the load cell body is at rest and all applied forces cancel out). It will also be appreciated that differential changes (i.e. opposite changes in sensor outputs) typically represent applied force, while common mode changes (i.e. similar changes in sensor outputs) typically represent environmental effects and other errors.

Linearization and common mode discrimination routines consistent with the invention preferably operate by analyzing changes over predetermined time periods and determining whether they represent applied force changes (force changes) or common mode effect changes (non-force changes). If a force change is determined, then the value of this change may be included in the present force value. However, if a non-force change is determined, then the value of this change may be blocked from incorporation into present force value. Zero shift errors are primarily rejected in this manner, which is significant since zero shift errors due to temperature have been found to typically be 10 to 20 times greater in magnitude than other environmental effects.

Figure 2:
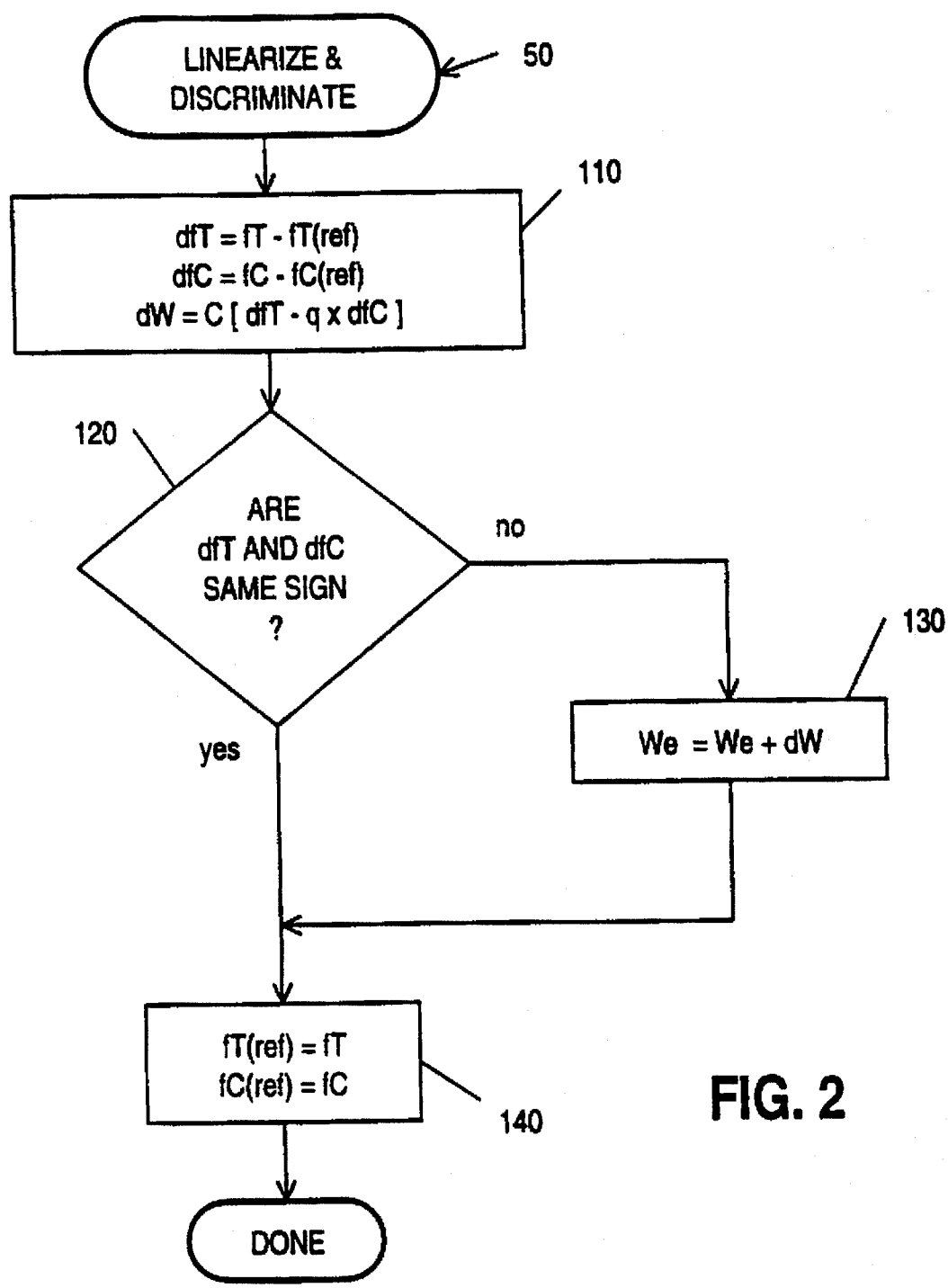
FIG. 2 is a flowchart of a preferred linearization and common mode discrimination routine for the assembly of FIG. 1.

A preferred linearization and common mode discrimination routine 50 is shown in FIG. 2, whereby force/non-force changes are discriminated or characterized by determining whether the changes in the output signals and reference values for the tension and compression force sensors over a predetermined time period have the same or different signs.

The first step in routine 50 (in block 110) is to calculate first and second difference values, designated dfT and dfC, which represent the changes in the tension and compression resonator outputs. These values are calculated from the equations:

$$dfT = fT - fT(ref) \quad (3)$$

$$dfC = fC - fC(ref) \quad (4)$$

where fT and fC are the first and second sensed values output from linear averagers 45a and 45b (the same as $fT_{avg}$ and $fC_{avg}$ described above) and fT(ref) and fC(ref) are first and second reference values representing the values of the resonator outputs during the last iteration of routine 50. The reference values may initially equal to the dead load resonant frequencies at start up.

Also in block 110, a force change value (representing the change in force value We and designated as dW), is calculated according to the equation:

$$dW = C[dfT - q \times dfC] \quad (5)$$

This calculation is described generally in Bell et al. The scaling factor q adjusts the relative sensitivities of the tension and compression sensors to linearize the response and better match the common mode effects on each sensor. Here, however, dfT and dfC represent the change from reference values fT(ref) and fC(ref), rather than a change from the dead load reference values as in Bell et al. The constant C scales the force change value to represent particular units, or to scale the response to within a desired range of values.

As discussed in Bell et al., the constants C and q are obtained by modelling the tension and compression frequency outputs by the equations:

$$fT = a_0 + a_1 We + a_2 We^2 \quad (6)$$

$$fC = b_0 + b_1 We + b_2 We^2 \quad (7)$$

where $a_{0-2}$ and $b_{0-2}$ are constant coefficients. Coefficients $a_0$ and $b_0$ are equivalent to the dead load frequencies fT0 and fC0 of the tension and compression resonators, respectively (as We is zero). Further, by solving the above equations for We, the following relationships are established:

$$q = \frac{a_2}{b_2} \quad (8)$$

$$C = \frac{1}{a_1 + q \times b_1} \quad (9)$$

Coefficients $a_{0-2}$ and $b_{0-2}$ are obtained by a linear coefficient calibration procedure which involves subjecting the load cell assembly to several known forces at a constant reference temperature, e.g., in a scale environment using a plurality of known weights, and recording the frequency outputs fT and fC for each known force. Once frequency readings are obtained, a least squares algorithm, or any other curve-fitting algorithm known in the art, may be used to calculate the coefficients $a_{0-2}$ and $b_{0-2}$ from the equations above. Once these coefficients are known, the C, q, fT0 and fC0 values may calculated based upon the above described relationships, then stored in the controller's memory to characterize the assembly.

It will be appreciated that since the linear coefficient calibration procedure occurs under constant environmental conditions, the procedure does not require assemblies to be subjected to multiple environments. Consequently, this procedure will typically take only a few minutes to run for each assembly.

Returning to FIG. 2, in block 120, the routine discriminates between force and non-force changes by comparing the signs of dfT and dfC. If dfT and dfC have the same sign, then each sensor is changing in the same way, indicating non-force change due to common mode effects. However, if dfT and dfC have different signs, then the sensors are changing complementary, indicating a force change due to applied force. Several methods exist for comparing the signs of two values, such as simply multiplying the values and checking whether the resulting value is positive or negative, whereby a positive result indicates same signs, and a negative result indicates different signs.

If a force change is determined in block 120, control passes to block 130 to update the estimated force value We, which is preferably stored in a running register which is fed by force changes. In this block, We is summed with the calculated force change value dW. Upon start up, this register may be initialized to zero, representing a dead load condition. Consequently, the register will only be updated as a result of changes in the sensor outputs only when the changes are recognized as being primarily due to applied force.

After block 130, or alternatively, if a non-force change is recognized in block 120, control passes to block 140 to update the reference values fT(ref) and fC(ref) to equal the present values of the force sensor outputs fT and fC, respectively. Consequently, when changes in the sensor outputs are recognized as being primarily due to common mode effects (a non-force change), the changes are lost because the reference values are allowed to "float" with the common mode changes. Moreover, even when a force change is sensed, the reference values are updated to reflect that the change has been incorporated into the estimated force value calculation.

Routine 50 provides several benefits. In particular, most common mode effects are never incorporated into the force value calculation, therefore eliminating the need to compensate for these effects later after they have been propagated through several calculations, often resulting in greater accuracy.

Further, routine 50 rejects most common mode errors irrespective of their source. Consequently, a separate compensation routine for each specific effect is not required, thereby reducing the amount of additional signal processing required.

Routine 50 may also reduce or eliminate costly and time-consuming environmental calibration testing for individual load cell assemblies. In applications where other effects such as span errors are not significant, and where extremely high resolution is not required, the environmental testing may be eliminated since the most significant common mode effect, zero shift, is corrected by routine 50.

Even in high resolution applications which may require some later compensation, e.g., for span errors, routine 50 reduces the amount of environmental testing required. As described below, span errors and other similar effects tend to be fairly consistent in lots (i.e., production runs) of load cell assemblies. Consequently, reliable calibration data for entire lots of assemblies may be obtained by testing only a few representative samples from the lot.

Figure 3:
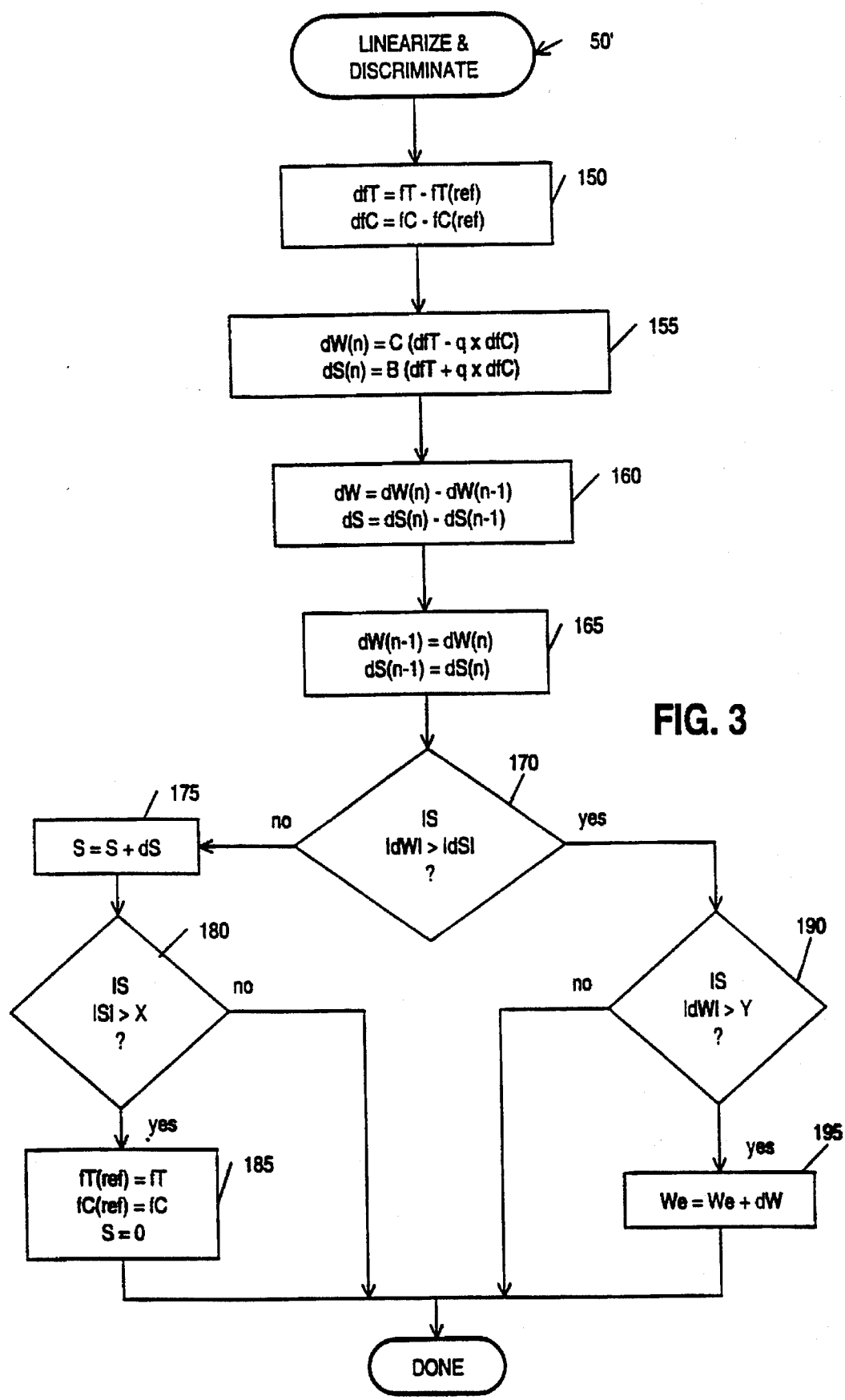
FIG. 3 is a flowchart of an alternate linearization and common mode discrimination routine for the assembly of FIG. 1.

FIG. 3 shows an alternate linearization and common mode discrimination routine 50' where the discrimination or characterization of sensor output changes is based upon a comparison of the relative magnitudes of applied force and common mode changes. It is believed that routine 50 (shown in FIG. 2) may allow some minor common mode changes to be propagated through force value calculations when the changes occur simultaneously with larger, differential mode changes resulting from applied force. Routine 50', on the other hand, incorporates secondary registers to accumulate or integrate relatively small common mode and differential mode changes which are dominated by their respective counterparts to reduce the likelihood of these changes being propagated through the force value calculations.

In routine 50', the first step, shown in block 150, is to calculate the first and second output difference values dfT and dfC in the same manner as block 110 of routine 50. Next, in block 155, force and common mode sample values, dW(n) and dS(n), are calculated and stored in separate registers according to the equations:

$$dW(n) = C[dfT - q \times dfC] \tag{10}$$

$$dS(n) = B[dfT + q \times dfC] \tag{11}$$

The force and common mode sample values, dW(n) and dS(n), represent present samples (i.e., at time n) of differential and common mode change components of the changes in the sensor outputs. The force sample value is calculated similar to the calculation in block 110 of routine 50. The common mode sample value represents the sum of the difference values. The constant B is preferably adjusted to tailor the response of the common mode sample value relative to the force sample value such that the later comparison step may favor one or the other, although it may be the same as the C constant. The q constant will typically be the same in both equations given that the constant is representative of the physical sensitivities of the force sensors.

Block 160 calculates force and common mode change values dW and dS which represent the differences from present (i.e., at time n) and last (i.e., at time n−1) values of the force and common mode sample values, as follows:

$$dW = dW(n) - dW(n-1) \tag{12}$$

$$dS = dS(n) - dS(n-1) \tag{13}$$

The force and common mode change values represent the instantaneous magnitudes of the rates of change of the force and common mode sample values over the sample period. Next, block 165 updates the past force and common mode sample values to reflect the respective present sample values, for the next iteration of routine 50' in the next sample period, as follows:

$$dW(n-1) = dW(n) \tag{14}$$

$$dS(n-1) = dS(n) \tag{15}$$

Next, block 170 compares the relative magnitudes (absolute values) of the force and common mode change values dW and dS to determine whether the changes in the sensor outputs are primarily due to force or non-force (common mode effect) changes.

If the changes are characterized as being a non-force change (dS≧dW), control passes to block 175 to accumulate the common mode change value dS in an accumulated value (register) S. Then, in block 180, the absolute value of the accumulated common mode change value S is compared to a common mode error threshold value X to determine whether the threshold has been exceeded. If the threshold has not been exceeded, routine 50' is completed for the present sample. If, however, the threshold is exceeded, then control passes to block 185 to update the reference values fT(ref) and fC(ref) with the present first and second sensed values fT and fC (similar to block 140 of routine 50), and to reset the accumulator S to zero (to reflect incorporation of accumulated error into reference values).

By accumulating the common mode change values, common mode errors are essentially integrated over time and updated only periodically when they become significant. Consequently, the threshold X is preferably selected to update the common mode errors at a reasonable rate.

Returning to block 170, if the changes in the sensor outputs are characterized as being a force change (dW>dS), control passes to blocks 190 and 195 to update the force value We. It will be appreciated that force value We may just be updated by summing it with the force change value dW whenever a force change is detected, similar to block 130 of routine 50. However, in this embodiment, it is preferred to first perform a creep compensation routine (blocks 190 and 195) to reduce or eliminate errors due to creep effects.

In block 190, the absolute value (magnitude) of the force change value dW is compared to a creep threshold value Y. If the force change value exceeds the creep threshold value Y, then control is passed to block 195 to update estimated force value We by summing it with force change value dW. If, however, the force change value does not exceed this threshold, the force value update is bypassed.

It will be appreciated that creep effects are typically characterized as slow changes in sensor outputs over time after the sensors have reached steady state conditions. Conversely, force changes are comparatively fast changes in the sensor outputs over time. Consequently, block 190 utilizes threshold value Y to discriminate between creep changes (low rates of change) and force changes (fast rates of change). The comparison generally operates as a high pass filter to accept only changes which occur at a relatively fast rate. Therefore, threshold Y is preferably selected to reject changes below a certain rate characteristic of creep effects. The low frequency changes are therefore essentially filtered or blocked from being incorporated into the force value calculation.

When a force change is determined in routine 50', reference values fT(ref) and fC(ref) are preferably not updated, since the routine at blocks 175–185 preferably allows the common mode effect changes to accumulate before they are incorporated into the reference values.

Figure 4:
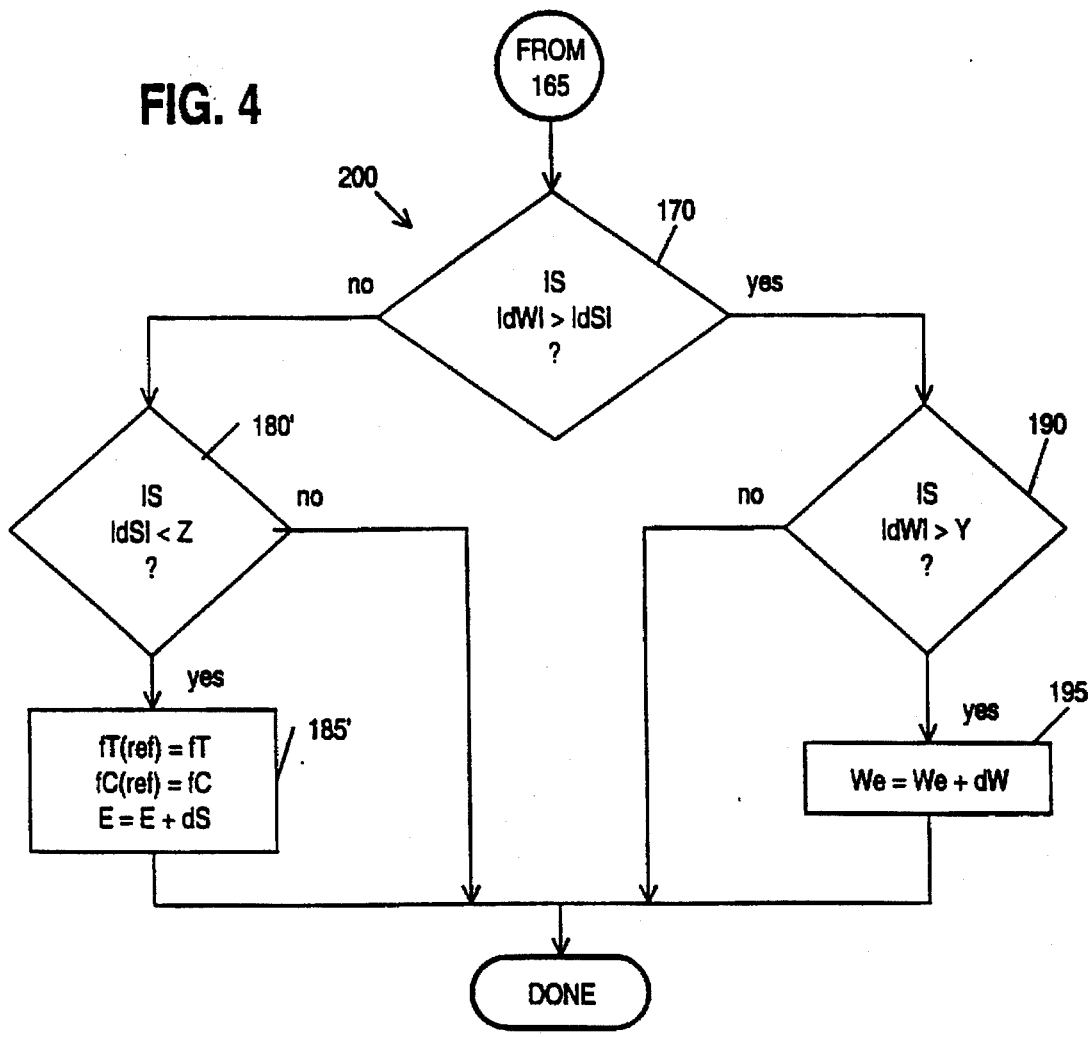
FIG. 4 is a flowchart showing several modifications to the error updating routine for the flowchart of FIG. 3.

FIG. 4 shows several modifications to linearization and common mode discrimination routine 50' of FIG. 3, including the blocks designated at 200 which replace blocks 170–195 of routine 50'. In FIG. 4, blocks 170, 190 and 195 operate the same as those in FIG. 3. However, blocks 180' and 185' introduce several alternative procedures that occur whenever common mode effect changes dominate applied force changes.

First, block 180' may be configured to withhold updating the reference values until the sensor outputs have settled. Block 180' preferably compares the magnitude (absolute value) of the common mode change value dS to a noise threshold value Z. If the common mode change value is greater than or equal to the noise threshold value, which typically occurs when the load cell assembly is unsettled (e.g., when a force is first applied to the assembly), then block 185' is bypassed. However, if the common mode change value is less than the noise threshold value (i.e., the load cell assembly is settled), then control passes to block 185' to update the reference values similar to block 185 in FIG. 3. The benefit of this modification is to avoid making decisions during noisy conditions.

Second, block 185' may be configured to accumulate the common mode change values dS in a register to provide a common mode value E, in a similar manner in which the estimated force value We is accumulated in block 195. It is believed that accumulating common mode change values may have several advantages, including using the information in further correction or compensation routines (e.g., correcting for span or other effects) as well as providing historical data regarding the common mode errors in the assembly.

Each of the above-described linearization and common mode discrimination routines preferably produces an estimated force value We which does not have most common mode effects incorporated therein, thereby providing improved resolution over wide ranges of environmental conditions. It will be appreciated, however, that various changes and modifications may be made to these basic routines consistent with the invention.

Span Correction

Returning to FIG. 1, after an estimated, linearized differential value We is computed, an optional step of correcting for span errors may be performed with a span correction routine diagrammatically indicated at 55. As discussed above, zero shift is the most significant source of common mode errors. Span error, or the error in transducer sensitivities due to temperature is typically the second most significant source of errors, but is typically less than ten percent of zero shift errors. Span errors due to other environmental effects such as barometric pressure and humidity are even less significant, but may also be compensated for in a similar manner to that described herein for temperature span errors.

The first step in span correction routine 55 is to calculate a temperature indicator $\Theta$, which is essentially the error in frequency units for the estimated weight. To compute temperature indicator $\Theta$, separate indicators, $\Theta T$ and $\Theta C$, are computed for the tension and compression resonators by subtracting the frequency computed as a function of the estimated weight from the actual frequency value obtained from the resonator, resulting in the following relationships:

$$\Theta T = fT - (a_0 + a_1 We + a_2 We^2) \quad (16)$$

$$\Theta C = fC - (b_0 + b_1 We + b_2 We^2) \quad (17)$$

The preferred temperature indicator $\Theta$ is simply the sum of the separate indicators $\Theta T$ and $\Theta C$. While it has been determined that the sum of the tension and compression parameters is a preferred temperature parameter, it has also been found that acceptable results may also be obtained by using either temperature indicator $\Theta T$ or $\Theta C$ alone.

The span corrected weight count reading, or force value, W, is computed from the estimated weight We by eliminating span error as follows:

$$W = We(1-S) \quad (18)$$

The span error S can be approximated as a second order equation (neglecting third order and higher errors) as a function of the temperature indicator $\Theta$ and span coefficients $s_{0-2}$:

$$S = s_0 + s_1 \Theta + s_2 \Theta^2 \quad (19)$$

With a dead load on the cell, and at the reference temperature used for calibrating the linearization routine, there will be no span error because the linear coefficients have biased the cell to operate properly at that temperature. Therefore, the temperature indicator $\Theta$ and the span error S will be zero, and consequently, $s_0$ will also be zero.

Consequently, in normal operation, span correction routine 55 calculates temperature indicator $\Theta$, then span error S, and then the span corrected weight count reading W. The span corrected weight count reading W may then be passed from span correction routine 55 to an output 60 for utilization by the primary weighing or other force sensing device to which the load cell assembly is connected.

Span coefficients $s_{1-2}$ are calculated through an additional span calibration procedure. In order to calibrate the cell for span correction, different frequency readings are taken for different temperatures, preferably using a reference weight which is near the load cell's capacity (a "full scale" reading). It is preferred to use $-5°$ C., $10°$ C. and $40°$ C. as the reference temperatures (with the cell linearized at $20°$ C.), as these temperatures conform to the operating requirements under OIML guidelines for class 3 devices. Any number of temperatures may be used alternatively, as long as sufficient data is obtained to get a reliable curve-fit.

The estimated weight We at each temperature is calculated as described above, then the temperature indicators $\Theta$ are calculated for each estimated weight reading. The span error S at each temperature is a function of the relative deviation in error of the estimated weight, which is:

$$S = \frac{We - \text{actual weight}}{\text{actual weight}} \quad (20)$$

As data points exist for S and $\Theta$ at each temperature, a least squares algorithm, or any other known curve-fitting routine, may be used to compute $s_1$ and $s_2$. Moreover, once the span calibration coefficients have been calculated for a load cell, they can be stored in the controller's memory to characterize the cell.

While the above-described calibration procedure may be used to calibrate individual load cells, it is believed that sufficiently accurate span correction coefficients may be obtained by calculating class parameters determined for selected samples within a lot or batch (i.e. a production run) of load cells. This is because span errors tend to be relatively consistent within individual cells in a lot. Consequently, significant savings in time and costs may be realized by taking readings for selected samples from a batch or lot, calculating the span coefficients therefrom, and storing the span coefficients in all of the load cells in the lot.

Controller Software Description

Figure 5:
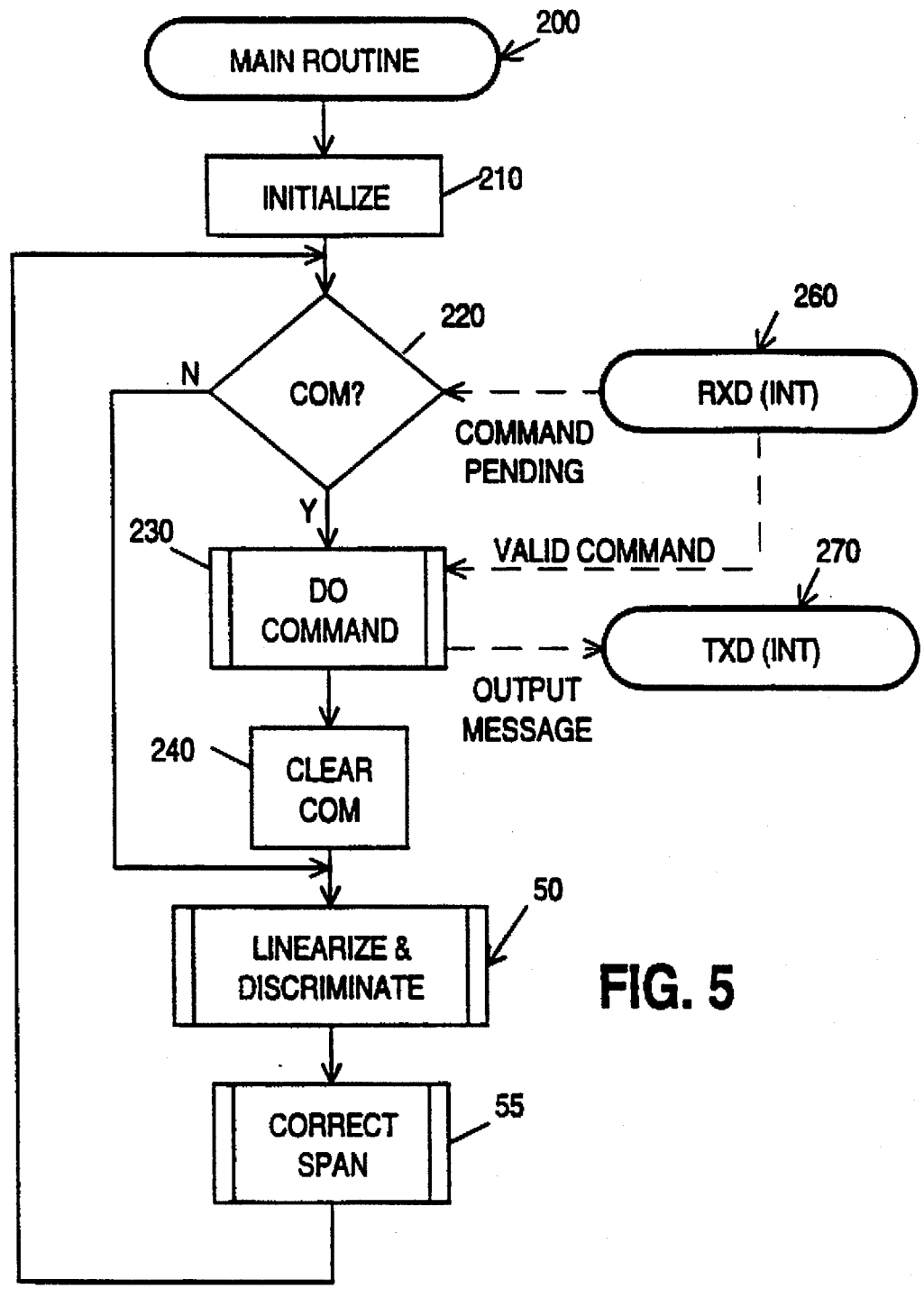
FIGS. 5 and 6 are flowcharts of a preferred software configuration for the assembly of FIG. 1.

FIG. 5 shows a flowchart generally describing the operation of a preferred software program for load cell controller 20. The software program is preferably an interrupt-driven system similar to that described in Bell et al.

Upon power-up of the controller, a main routine 200 is initiated. Initialization is performed in block 210, then the main routine enters a main loop which runs continuously until a reset or power-down. This main loop essentially handles information exchange over the load cell bus and updates the weight reading sensed by load cell 10. First, a COM flag is tested in block 220 to determine whether a valid command has been received by the controller over the load cell bus. If the COM flag has been set, the command is processed in DO COMMAND command processor block 230, and once the command has been processed, the COM flag is cleared in block 240.

DO COMMAND routine 230 processes commands received from the load cell bus, performs the necessary routines for executing the received commands, and sends out responses to commands or information across the load cell bus to the weighing or other force sensing device. Further, several interrupts independently handle the reception and transmission of information and commands across the load cell bus. The RXD data received interrupt routine 260 is initiated whenever a character is received across the bus. When a complete command is received, the routine sets the COM flag to indicate a pending and valid command to main routine 200. The TXD data transmit interrupt 270 is initiated to transmit an output message compiled by main routine 200 over the bus. The operation and configuration of the command processing routines for the preferred controller 20 are generally described in Bell et al.

Returning to main routine 200, once the pending commands have been handled, control passes to update the weight reading sensed by load cell 10. First, linearization and common mode discrimination is performed as described above in block 50, or another suitable routine (e.g., as described above with relation to any of the routines shown in FIGS. 2–4). Second, span correction is performed in block 55 as described above in relation to FIG. 1. Control then loops back to block 220.

Figure 6:
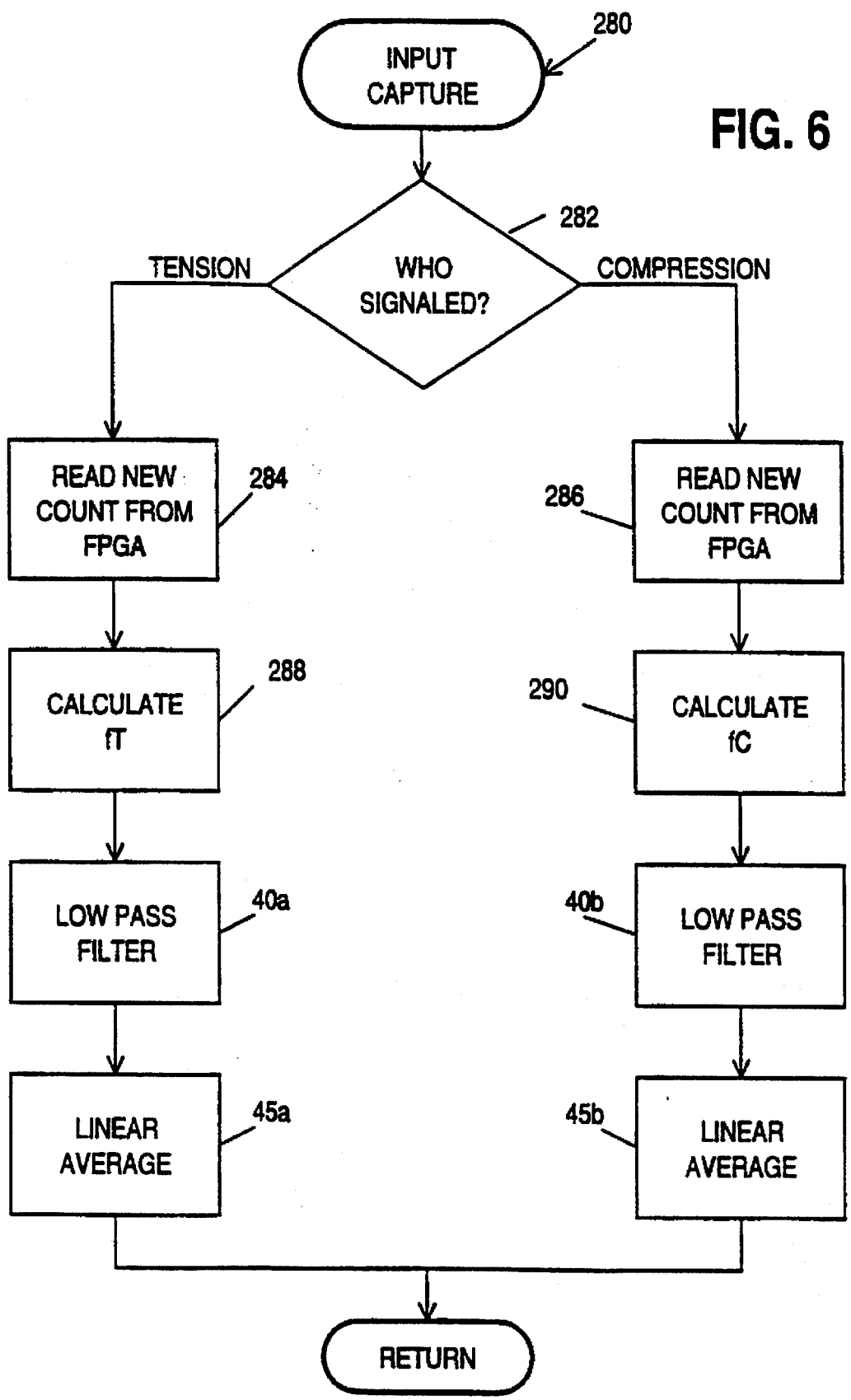

As shown in FIG. 6, a separate input capture interrupt routine 280 is initiated preferably by an external interrupt being asserted by the FPGA in controller 20. This interrupt will typically be asserted whenever either of the tension or compression latches 30a or 30b has latched a value of the time base frequency counter 35. The assertion of the interrupt request itself is described in Bell et al.

Input capture routine 280 first determines which of the tension or compression latches has signalled the interrupt in block 282. Depending upon which latch signaled the interrupt, program flow will be directed down one of two flow paths. If the tension latch signals the interrupt, control is passed to block 284 to obtain the value stored in tension latch 30a in the FPGA. Next, in block 288, this value is utilized to calculate fT, which is the difference between successive outputs of the tension latch. Then, the new value of fT is filtered by low pass filter routine 40a as described above with relation to FIG. 1. Next, the filtered value is averaged by linear averager routine 45a as is also described above with relation to FIG. 1. After m samples are taken in block 45a, a filtered and averaged representation of the tension resonator frequency is stored as the current value of $fT_{avg}$. After block 45a, control is returned to main routine 200.

Similarly, if compression latch 30b signals the interrupt, input capture routine 280 passes control to block 286 to obtain the value stored in compression latch 30b in the FPGA. Next, in block 290, the present value of fC is computed by taking the difference between the present and last outputs of latch 30b. Then, the present value is filtered by low pass filter routine 40b and is averaged by linear averager routine 45b, as described above with relation to FIG. 1. After m samples are taken in block 45b, a filtered and averaged representation of the compression resonator frequency is stored as the current value of $fC_{avg}$. After block 45b, control is returned to main routine 200.

As an overview, it can be seen that software for a load cell controller 20 will generally remain in a main loop to process commands and update the weight based upon the current stored values for fT and fC. Whenever a character is received or transmitted across the load cell bus, or whenever a new value is stored in the tension or compression latches in the FPGA, control will be diverted to the proper interrupt routine for handling. One skilled in the art will appreciate that alternative program controls may be utilized to perform similar or alternate functions in controlling the preferred load cell assembly.

The software code necessary for operating the specific hardware and functional descriptions implemented in preferred controller 20 is generally described in Bell et al. However, it will be understood that other software routines may also be implemented consistent with the invention.

It will therefore be appreciated that the invention provides a load cell assembly having improved rejection of common mode effects through linearization and common mode discrimination. As one skilled in the art will appreciate that various changes and modifications may be made to the preferred embodiments without departing from the spirit and scope of the invention, the invention thus resides in the claims hereafter appended.

We claim:

1. A load cell assembly for generating a force value indicative of an applied force, the load cell assembly comprising:

a load cell body adapted to receive the applied force;

first and second sensing means, coupled to the load cell body, for respectively providing first and second sensed signals which react in a complementary manner in response to the applied force on the load cell body;

means for sampling the first and second sensed signals at predetermined intervals of time to produce first and second change values representative of changes in the values of the first and second sensed signals over such predetermined time interval, each of said first and second change values having a magnitude value and a direction of change;

means for determining when the directions of change in the first and second change values are different; and force calculating means, responsive to the determining means, for calculating the force value of the applied force from the magnitudes of the first and second change values.

2. The load cell assembly of claim 1, wherein the first and second sensing means respectively comprise:

(a) first and second force transducers, each of the type having a resonant frequency that varies with a force applied thereto;

(b) first and second driving means for driving the first and second transducers at their resonant frequencies and thereby respectively providing the first and second sensed signals; and (c) converting means for converting the first and second sensed signals into digital first and second sensed values, respectively.

3. The load cell assembly of claim 2, wherein the load cell body comprises:
   (a) an interior opening defined in the load cell body by an upper wall and a lower wall joined by first and second side walls;
   (b) a base positioned within the opening and affixed to at least one of the opening walls;
   (c) a first cantilever beam affixed to the base;
   (d) a second cantilever beam affixed to the base; and
   (e) wherein the first transducer is affixed between the first cantilever beam and the base and the second transducer is affixed between the second cantilever beam and the base.

4. The load cell assembly of claim 3, wherein the first and second transducers each comprise a double-ended tuning fork resonator.

5. The load cell assembly of claim 1, wherein the first and second sensing means each comprise a strain gauge.

6. The load cell assembly of claim 1, further comprising span correction means for correcting the force value for span effects.

7. The load cell assembly of claim 1, wherein the determining means comprises:
   (a) means for calculating first and second difference values, the first difference value being representative of the difference between the first sensed value and a first reference value, and the second difference value being representative of the difference between the second sensed value and a second reference value; and
   (b) means for comparing the signs of the first and second difference values, wherein same signs represent common mode effect changes and different signs represent applied force changes.

8. The load cell assembly of claim 7, further comprising reference value updating means for updating the first and second reference values to be equivalent to the first and second sensed values, respectively, after each sampling of the first and second sensed signals.

9. The load cell assembly of claim 8, wherein the force calculating means comprises adding a force change value to the force value responsive to an applied force change, wherein the force change value is representative of the difference between (1) the first difference value and (2) the second difference value multiplied by a scaling factor.

10. The load cell assembly of claim 1, wherein the determining means comprises:
    (a) means for calculating a force sample value, the force sample value being representative of the difference between (1) the difference between the first sensed value and a first reference value and (2) a scaled difference between the second sensed value and a second reference value; and
    (b) means for calculating a common mode sample value, the common mode sample value being representative of the sum of (1) the difference between the first sensed value and a first reference value and (2) a scaled difference between the second sensed value and a second reference value.

11. The load cell assembly of claim 10, wherein the determining means further comprises:
    (a) means for calculating a force change value, the force change value being representative of the difference between force sample values taken in successive samples;
    (b) means for calculating a common mode change value, the common mode change value being representative of the difference between common mode sample values taken in successive samples; and
    (c) means for comparing the relative magnitudes of the force change value and common mode change value, wherein a greater magnitude for the common mode change value represents common mode effect changes and a greater magnitude for the force change value represents applied force changes.

12. The load cell assembly of claim 11, further comprising means for updating a common mode value by adding the common mode change value to the common mode value when the magnitude of the common mode change value exceeds that of the force change value.

13. The load cell assembly of claim 11, wherein the force calculating means comprises means for adding the force change value to the force value when the magnitude of the force change value exceeds that of the common mode change value.

14. The load cell assembly of claim 13, wherein the force calculating means further comprises means for comparing the force change value to a creep threshold value, the creep threshold value being representative of a rate that is characteristic of creep, and wherein the force calculating means adds the force change value to the force value only when the force change value exceeds the creep threshold value.

15. The load cell assembly of claim 13, further comprising reference value updating means for updating the first and second reference values to be equivalent to the first and second sensed values, respectively.

16. The load cell assembly of claim 15, wherein the reference value updating means updates the first and second reference values when the magnitude of the common mode change value is greater than or equal to that of the force change value.

17. The load cell assembly of claim 16, wherein the reference value updating means further comprises means for comparing the common mode change value to a noise threshold value, wherein the reference value updating means updates the first and second reference values when the common mode change value is greater than the noise threshold value.

18. The load cell assembly of claim 16, wherein the reference value updating means further comprises means for accumulating the common mode change values to provide an accumulated common mode change value, and means for comparing the accumulated common mode change value to a common mode error threshold value, and wherein the reference value updating means updates the first and second reference values when the accumulated common mode change value exceeds the common mode error threshold value.

19. A driver for generating a force value indicative of a force that is applied to a load cell assembly of the type including first and second force sensors which have complementary sensitivity to the applied force, the driver comprising:
    first and second sampling means, coupled to the first and second force sensors, for periodically providing first and second sensed values, respectively, each of said first and second sensed values having a magnitude value and a direction of change;
    means for determining when the directions of change in the first and second sensed values are different; and
    force accumulating means, responsive to the determining means, for calculating the force value of the applied force from the magnitudes of the first and second change values.

20. The driver of claim 19, further comprising reference value updating means for updating the first and second reference values to respectively equal the first and second sensed values.

21. The driver of claim 19, wherein the characterizing means comprises:

(a) means for calculating the force change value, wherein the force change value is representative of the difference in applied force between the pair of samples;

(b) means for calculating a common mode change value representative of the difference in common mode effects between the pair of samples; and (c) means for comparing absolute values of the force change value and the common mode change value, wherein a greater absolute value for the force change value represents a force change, and a greater absolute value for the common mode change value represents a non-force change.

22. The driver of claim 21, wherein:

(a) the force change value is representative of the difference between force sample values for the pair of samples, each force sample value for a sample being representative of the difference between (1) the difference between the first sensed value at the sample and a first reference value and (2) a scaled difference between the second sensed value at the sample and a second reference value; and (b) the common mode change value is representative of the difference between common mode sample values for the pair of samples, each common mode sample value at a sample being representative of the sum of (1) the difference between the first sensed value at the sample and the first reference value and (2) a scaled difference between the second sensed value at the sample and the second reference value.

23. The driver of claim 22, wherein the force accumulating means further comprises means for comparing the force change value to a creep threshold value, and wherein the force calculating means only sums the force change value with the force value when the force change value exceeds the creep threshold value.

24. A method for generating a force value indicative of an applied force in a load cell assembly of the type including first and second force sensors mounted in a load cell body to exhibit complementary sensitivity to the applied force, comprising:

driving the first and second force sensors to generate first and second sensed signals, respectively;

calculating first and second change values representative of respective changes in the first and second sensed signals over a predetermined time period, each of said first and second change values having a magnitude value and a direction of change;

determining when the directions of change in the first and second change values are different; and calculating the force value of the applied force from the magnitudes of the first and second change values.

25. The method of claim 24, further comprising the step of updating the first and second reference values to respectively equal the first and second sensed values.

26. The method of claim 24, wherein the first and second force sensors each comprise a double-ended tuning fork resonator having a resonant frequency which varies with force applied thereto, the method further comprising the step of converting the first and second sensed signals into digital first and second sensed values, respectively.

27. The method of claim 24, wherein:

(a) the calculating step includes the steps of calculating force and common mode change values, wherein the force change value is representative of the difference in applied force between a pair of force sample values, each force sample value being representative of the difference between (1) the difference between a first sensed value at the sample and a first reference value and (2) a scaled difference between a second sensed value at the sample and a second reference value, and wherein the common mode change value is representative of the difference in common mode effects between a pair of common mode sample values, each common mode sample value being representative of the sum of (1) the difference between the first sensed value at the sample and the first reference value and (2) a scaled difference between the second sensed value at the sample and the second reference value, the first and second sensed values being digital representations of the first and second sensed signals at the sample; and (c) the determining step includes the step of comparing the absolute values of the force and common mode change values, wherein a greater absolute value for the force change value represents a force change, and a greater absolute value for the common mode change value represents a non-force change.

28. The method of claim 27, further comprising the step of comparing the force change value to a creep threshold value, and wherein the updating step sums the force change value with the force value only when the force change value exceeds the creep threshold value.

29. The method of claim 27, further comprising the step of updating a common mode value by adding the common mode change value to the common mode value when the magnitude of the common mode change value exceeds that of the force change value.

30. The method of claim 27, further comprising the step of updating the first and second reference values to be equivalent to the first and second sensed values, respectively, when the magnitude of the common mode change value is greater than or equal to that of the force change value.

31. The method of claim 30, wherein the reference value updating step includes the step of comparing the common mode change value to a noise threshold value, and wherein the reference value updating step updates the first and second reference values only when the common mode change value is less than the noise threshold value.

32. The method of claim 30, wherein the reference value updating step includes the steps of accumulating the common mode change values to provide an accumulated common mode change value and comparing the accumulated common mode change value to a common mode error threshold value, and wherein the reference value updating step updates the first and second reference values only when the accumulated common mode change value exceeds the common mode error threshold value.

33. The method of claim 24, further comprising the step of correcting the force value for span effects.

\* \* \* \* \*